US006791932B1

(12) United States Patent
Maruyama (10) Patent No.: US 6,791,932 B1
(45) Date of Patent: Sep. 14, 2004

(54) OPTICAL SYSTEM OF OPTICAL PICK-UP

(75) Inventor: Koichi Maruyama, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/556,416

(22) Filed: Apr. 24, 2000

(30) Foreign Application Priority Data

Apr. 23, 1999 (JP) .......................................... 11-117213

(51) Int. Cl.[7] .............................................. G11B 7/00
(52) U.S. Cl. .............................. 369/112.05; 369/112.23
(58) Field of Search ......................... 369/44.26, 44.27, 369/112.03, 112.04, 112.07, 112.12, 112.05, 112.23

(56) References Cited

U.S. PATENT DOCUMENTS

| | | | |
|---|---|---|---|
| 5,633,852 A | | 5/1997 | Maruyama et al. ......... 369/112 |
| 5,835,473 A | * | 11/1998 | Shimozono et al. ... 369/112.23 |
| 5,838,496 A | | 11/1998 | Maruyama et al. ......... 359/565 |
| 5,883,744 A | | 3/1999 | Maruyama .................. 359/565 |
| 6,043,912 A | | 3/2000 | Yoo et al. ..................... 369/44 |
| 6,084,843 A | * | 7/2000 | Abe et al. ............... 369/112.07 |
| 6,088,322 A | | 7/2000 | Broome et al. ............. 369/112 |
| 6,349,083 B1 | * | 2/2002 | Kiriki et al. ........... 369/112.08 |
| 6,363,037 B1 | * | 3/2002 | Yamazaki .............. 369/112.06 |

FOREIGN PATENT DOCUMENTS

| | | |
|---|---|---|
| EP | 0747893 | 12/1996 |
| EP | 0838812 | 4/1998 |
| JP | 11183795 | 7/1999 |
| NL | 1008739 | 9/1998 |

* cited by examiner

*Primary Examiner*—Thang V. Tran
*Assistant Examiner*—Bach Vuong
(74) *Attorney, Agent, or Firm*—Greenblum & Bernstein, P.L.C.

(57) ABSTRACT

An optical system of an optical pick-up that is capable of using thin cover type and thick cover type optical discs. The system includes a light source portion for emitting a short wavelength laser beam for the thin cover type optical disc and a long wavelength laser beam for the thick cover type optical disc, and an objective lens for converging the laser beam onto an information layer of the optical disc through the cover layer. The objective lens has a diffractive lens structure having wavelength dependence such that spherical aberration varies in the overcorrected direction as incident wavelength increases. The light source portion emits the laser beam such that divergence of the long wavelength laser beam incident on the objective lens is larger than that of the short wavelength laser beam. The objective lens converges the laser beams of an identical diffractive order without changing position thereof.

8 Claims, 7 Drawing Sheets

SPHERICAL ABERRATION

FIG.5B

ASTIGMATISM

FIG.6A

SPHERICAL ABERRATION

FIG.6B

ASTIGMATISM

SPHERICAL ABERRATION
SINE CONDITION

FIG.8B

ASTIGMATISM

FIG.9A

SPHERICAL ABERRATION

FIG.9B

ASTIGMATISM

SPHERICAL ABERRATION
SINE CONDITION

FIG.11B

ASTIGMATISM

FIG.12A

SPHERICAL ABERRATION
SINE CONDITION

FIG.12B

ASTIGMATISM

OPTICAL SYSTEM OF OPTICAL PICK-UP

BACKGROUND OF THE INVENTION

The present invention relates to an optical system for an optical pick-up that is capable of using a plurality of kinds of optical discs whose cover layers have different thickness.

The optical disc includes an information layer on which digital information is recorded, and a transparent cover layer that covers the information layer. A laser beam from the optical pick-up is converged to form a beam spot on the information layer through the cover layer. A turntable of an optical disc apparatus rotates the optical disc mounted thereon, and the optical pick-up, which is movable along a radial direction of the optical disc, reproduces the recorded signal from the optical disc or records the information onto the optical disc. Difference of thickness of the cover layer changes the position of the information layer with reference to the turntable, which changes the distance between the optical pick-up and the information layer.

Namely, the thicker the cover layer is, the farther the distance to the beam spot from the optical pick-up is. For example, since the cover layer of a compact disc (CD) or that of a CD-R has the thickness of 1.2 mm, and the thickness of the cover layer of a digital versatile disc (DVD) is 0.6 mm, the optical pick-up is required to move the beam spot away from the optical pick-up by 0.6 mm in the cover layer (0.4 mm in air) when the DVD Is replaced with the CD or the CD-R.

There are two methods to move the beam spot along an optical axis direction. The first method changes the divergence of the incident laser beam onto the objective lens, which is equivalent to change an object distance. For instance, the change of the distance between the laser source and a collimator lens changes the object distance. The second method moves the objective lens along the optical axis while keeping the incident laser beam parallel.

In the first method, spherical aberration sharply varies in undercorrected direction as the divergence becomes larger (the object distance decreases), which disturbs wave front of the laser beam. Thus, the diameter of the beam spot increases, which prevents the optical disc apparatus from reproducing the recorded information from the optical disc. In this connection, since the cover layer is a plane parallel plate disposed in a convergent laser beam, it changes the spherical aberration in overcorrected direction as the thickness thereof increases. However, since the variation of the spherical aberration in the undercorrected direction due to the divergence change far exceeds the variation in the overcorrected direction due to the thickness change, the spherical aberration in the undercorrected direction remains as a result.

The second method can be accomplished using a focusing actuator. An optical pick-up is provided with the focusing actuator to move the objective lens along the optical axis to keep the laser beam in focus. Therefore, if the focusing actuator has a driving stroke that is longer than 0.4 mm, the optical pick-up can move the beam spot In response to the change of the cover layer thickness. However, since the large stroke tends to increase an inclination of the optical axis of the objective lens, a complex mechanism is required to prevent the inclination, which increases the cost.

SUMMARY OF THE INVENTION

It is therefore an object of the present invention to provide an optical system of an optical pick-up, which is capable of moving a beam spot along an optical axis in accordance with thickness of the cover layer without moving an objective lens.

For the above object, according to the present invention, there is provided an improved optical system of an optical pick-up that is capable of using a first optical disc having a first cover layer and a second optical disc having a second cover layer thicker than the first cover layer, which includes a light source portion that emits a first laser beam having a first wavelength for the first optical disc and a second laser beam having a second wavelength longer than the first wavelength for the second optical disc, and an objective lens that converges the first laser beam from the light source portion onto an information layer of the first optical disc through the first cover layer and that converges the second laser beam from the light source portion onto the information layer of the second optical disc through the second cover layer. The objective lens is provided with a diffractive lens structure that has a plurality of concentric ring-shaped steps.

The optical system of the present invention further satisfies the following requirements (a), (b) and (c).

(a) The light source portion emits the laser beam such that divergence of the second laser beam incident on the objective lens is larger than divergence of the first laser beam.

(b) The diffractive lens structure has a plurality of concentric ring-shaped steps to have wavelength dependence such that spherical aberration varies in the overcorrected direction as wavelength of incident light increases.

(c) The objective lens converges the first and second laser beams of an identical diffractive order while keeping a constant distance between the objective lens and the surfaces of the first and second cover layers.

The different divergence of the incident laser beam onto the objective lens as the requirement (a) changes a paraxial beam spot according to the thickness of the cover layer. However, the spherical aberration in the undercorrected direction becomes large for the second optical disc with larger divergence, only when the divergence becomes larger. In order to cancel the spherical aberration caused by the divergence change, the diffractive lens structure has the wavelength dependence as described in the requirement (b).

In this construction, the switch from the first laser beam to the second laser beam increases the divergence and the wavelength thereof. The lager divergence moves the paraxial beam spot away from the light source portion and changes the spherical aberration in the undercorrected direction. On the other hand, the larger wavelength varies the spherical aberration in the overcorrected direction by means of the diffractive lens structure. As a result, the switch of the laser beam moves the beam spot along an optical axis without increasing the spherical aberration.

Further, the use of the identical diffractive order beams as the requirement (c) allows the diffractive lens structure to be optimized for a single diffractive order, which enables to maximize diffractive efficiency with the effective use of light amount.

An additional optical path length added by the diffractive lens structure is expressed by the following optical path difference function $\Phi(h)$:

$$\Phi(h)=(P_2h^2+P_4h^4+P_6h^6+\ldots)\times\lambda$$

where $P_2$, $P_4$ and $P_6$ are diffractive coefficients of second, fourth and sixth orders, h is a height from the optical axis and $\lambda$ is wavelength of incident light.

It is preferable that the diffractive lens structure satisfies the following condition (1);

$$7 < \Phi(h_{45})/\lambda - P_2 \times (h_{45})^2 < 15 \quad (1)$$

where $h_{45}$ is the height from the optical axis of a point where a light ray whose NA is 0.45 intersects the diffractive lens structure.

When the thickness of the first cover layer is 0.6 mm and the thickness of the second cover layer is 1.2 mm, the firs wavelength $\lambda_1$ and the second wavelength $\lambda_2$ preferably satisfy the following condition (2);

$$0.81 < \lambda_1/\lambda_2 < 0.85. \quad (2)$$

Further, the blaze wavelength $\lambda_B$ of the diffractive lens structure satisfies $\lambda_1 < \lambda_B < \lambda_2$ at least in a central area close to the optical axis. More preferably, the blaze wavelength $\lambda_B$ of the diffractive lens structure in the central area satisfies the following conditions (3) and (4);

$$0.87 < \lambda_B/\lambda_2 \quad (3)$$

$$\lambda_B/\lambda_1 < 1.13. \quad (4)$$

Still further, the additional optical path length added by the ring-shaped step of the diffractive lens structure in a peripheral area may be shorter than that in the central area. In particular case, the diffractive lens structure is only formed within a central area of a lens surface of the objective lens, and a peripheral area thereof is formed as a continuous surface. At least an area outside an 85% line of an effective diameter of the objective lens is defined as the peripheral area. The boundary between the central area and the peripheral area may be an 80% line of the effective diameter.

The light source portion preferably emits the laser beams such that the first laser beam is incident on the objective lens as a parallel beam and the second laser beam is incident on the objective lens as a divergent beam.

DESCRIPTION OF THE EMBODIMENTS

An embodiment of the present invention will be described hereinafter. In the following description, the total optical system of the embodiment is described first, and then, three numerical examples will be described.

Figure 1:
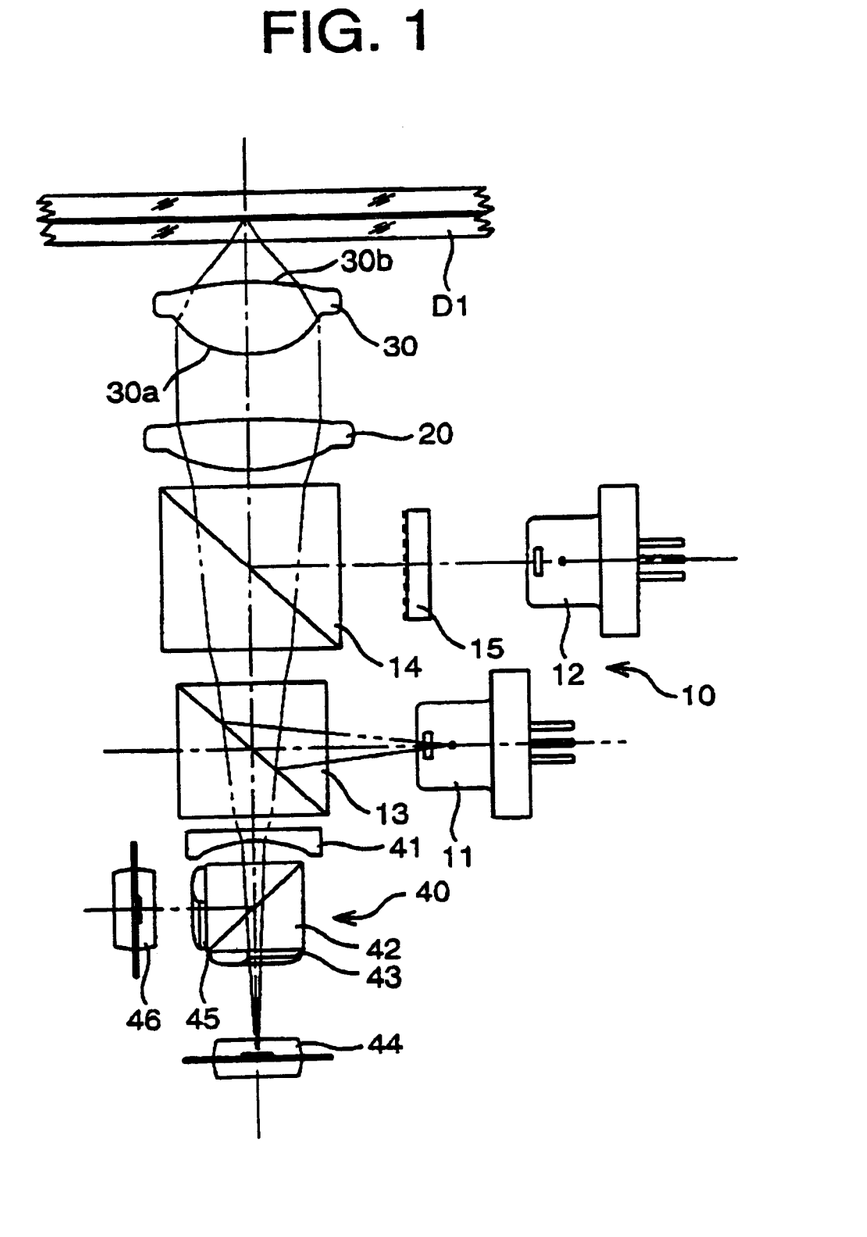
FIG. 1 shows an optical system of the optical pick-up according to an embodiment with a thin cover type optical disc (a first optical disc)
Figure 2:
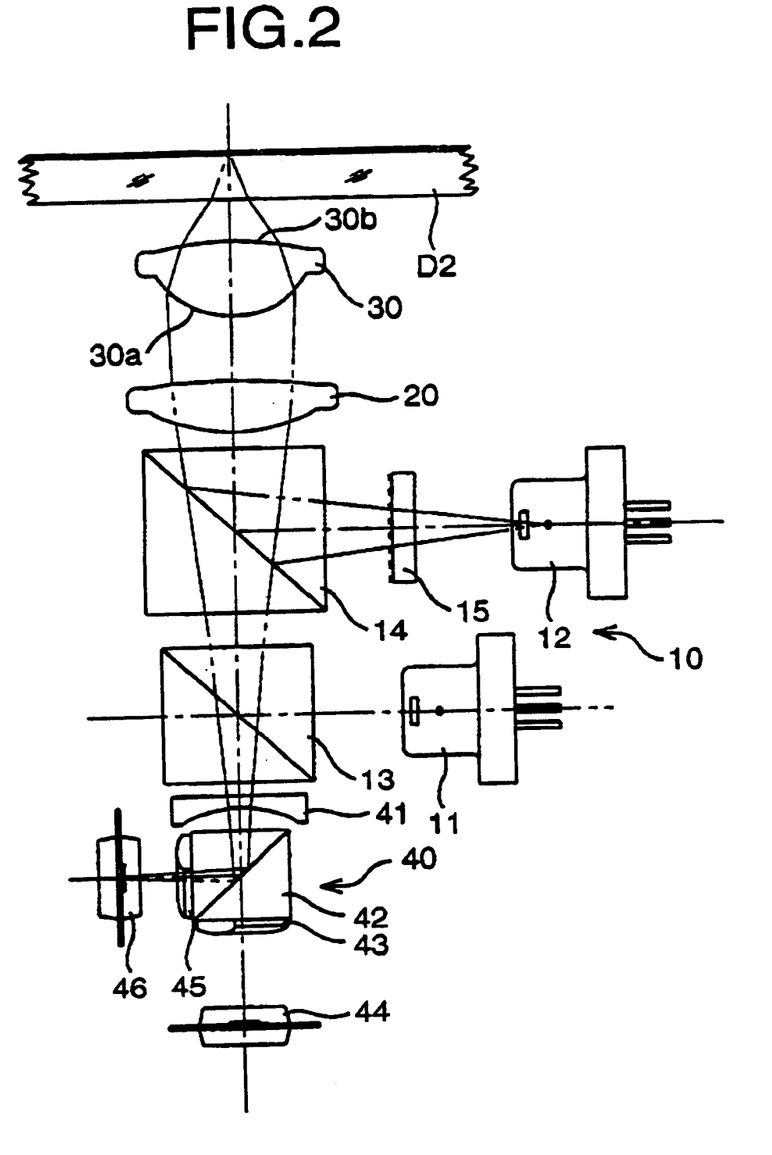
FIG. 2 shows the optical system of the optical pick-up according to the embodiment with a thick cover type optical disc (a second optical disc)
Figure 3A:
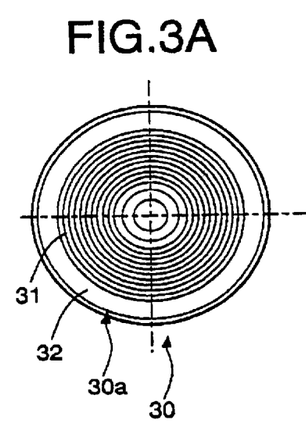
FIG. 3A is a front view of an objective lens in the optical system of FIG. 1.
Figures 3B, 3C:
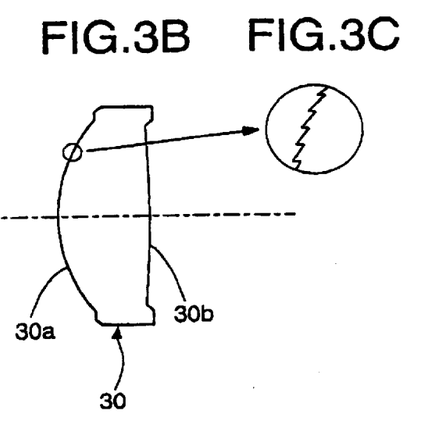
FIG. 3B is a vertical cross-sectional view of the objective lens of FIG. 3A.
FIG. 3C is an enlarged view of FIG. 3B.

FIGS. 1 and 2 show an optical system of the optical pick-up according to the embodiment. The optical pick-up is applied to an optical disc apparatus that is capable of using a first optical disc having a first cover layer and a second optical disc having a second cover layer thicker than the first cover layer. In the embodiment, the first disc has a cover layer of 0.6 mm in thickness such as a DVD (digital versatile disc) and the second disc has a cover layer of 1.2 mm in thickness such as a CD (compact disc) or a CD-R (CD recordable). FIGS. 1 and 2 show the optical system with the first optical disc D1 and the second optical disc D2, respectively. Further, FIGS. 3A, 3B and 3C are schematic view of an objective lens used in the optical system of FIGS. 1 and 2.

As shown in FIGS. 1 and 2, the optical system includes a light source portion 10, a collimator lens 20, an objective lens 30 and a signal detecting portion 40. The light source portion 10 is provided with a first semiconductor laser 11 that emits a first laser beam having a first wavelength $\lambda_1$ when the first optical disc D1 is used, a second semiconductor laser 12 that emits a second laser beam having a second wavelength $\lambda_2$ longer than the first wavelength when the second optical disc D2 is used, and first and second beam splitter 13 and 14 that reflect the first and second laser beams from the semiconductor lasers 11 and 12 toward the objective lens 30. A phase grating plate 15 is located between the second semiconductor laser 12 and the second beam splitter 14 to divide the second laser beam into three portions for a tracking error detection by a three-beam method.

The collimator lens 20 is a single positive lens whose refractive power is determined such that the first laser beam from the first semiconductor laser 11 becomes a parallel beam when the beam is incident on the objective lens 30 as shown in FIG. 1. The distance between the second semiconductor laser 12 and the collimator lens 20 is shorter than the distance between the first semiconductor laser 11 and the collimator lens 20. Thus, the second laser beam from the second semiconductor laser 12 is incident on the objective lens 30 as a divergent beam as shown in FIG. 2. When the divergence of the laser beam (i.e., the object distance) switched, a paraxial beam spot moves along the optical axis in a cover layer without moving the objective lens 30.

In reality, since thickness variation and warpage of an optical disc may move the information layer by a few tens of $\mu$m, the objective lens follows the movement in some cases. A general focusing mechanism having short driving stroke can respond to such a movement.

Since the recording density of the first optical disc D1 is higher than that of the second optical disc D2, the beam spot on the first disc D1 should be smaller than that on the second optical disc D2. The shorter the wavelength is, the smaller the spot diameter is. Thus, the wavelength $\lambda_1$ of the first laser beam is preferably in the 600 nm range to form the relatively small beam spot. On the other hand, the reflection characteristics of the CD-R requires the laser beam whose wavelength is about 780 nm. Use of the two semiconductor lasers having different wavelengths is predicated on the difference of the recording density and the reflection characteristics as described.

The objective lens 30 converges the parallel first laser beam onto the information layer of the first optical disc D1 and converges the divergent second laser beam onto the information layer of the second optical disc D2 without change its position.

The laser beam reflected from the optical disc and passes through the beam splitters 14 and 13 is incident on the signal detecting portion 40. The signal detecting portion 40 includes a plano-concave lens 41, a beam splitter 42, a pair of cylindrical lenses 43 and 45, and a pair of sensor 44 and 46. The plano-concave lens 41 weakens the convergence of the reflected beam from the optical disc. The transmission beam through the beam splitter 42 enters in the first sensor 44 through the cylindrical lens 43. On the other hand, the reflected beam by the beam splitter 42 enters in the second sensor 46 through the cylindrical lens 45.

The object distance s from an object point of the incident laser beam on the objective lens 30 to a front principal point of the objective lens 30, the image distance s' from a rear principal point to an image point, and focal length f of the objective lens 30 satisfy the equation;

$$-\frac{1}{s} + \frac{1}{f} = \frac{1}{s'}$$

For example, when f=3.6 mm, the image distance s' for the first laser beam is given;

$$s'=3.6 \text{ mm}$$

Because the object distance s for the parallel first laser beam Is infinity. The first laser beam is used for the first optical disc D1 whose cover layer is 0.6 mm in thickness and the second laser beam is used for the second optical disc D2 whose cover layer is 1.2 mm in thickness. Thus, the second beam should form the beam spot away from the beam spot of the first laser beam by 0.4 mm (that is equivalent to 0.6 mm in the cover layer), the image distance s' for the second laser beam should be 4.0 mm. It is assumed that the focal length f is constant;

$$-\frac{1}{s} + \frac{1}{3.6} = \frac{1}{4.0}$$

$$\frac{1}{s} = \frac{1}{3.6} - \frac{1}{4.0} = \frac{1}{36}$$

The object distance s for the second laser beam becomes 36 mm. The positional relationship between the first and second semiconductor lasers and the collimator lens is determined to satisfy the condition of the object distance as described.

However, a lens whose spherical aberration and coma are corrected, such as an objective lens for an optical pick-up, varies the spherical aberration according to the change of the object distance. When the spherical aberration is corrected for the parallel first laser beam, the spherical aberration becomes large in the undercorrected direction for the divergent second laser beam. In order to compensate the undercorrected spherical aberration, a diffractive lens structure is formed on the first surface 30a of the objective lens 30. Since aberration correction effect of the diffractive lens structure is proportional to the wavelength, it is possible to give wavelength dependence of the spherical aberration that cancels the spherical aberration caused by the divergence change.

A detail of the objective lens 30 will be described with reference to FIGS. 3A, 3B and 3C. FIG. 3A is a front view of the objective lens 30, FIG. 3B is a vertical cross-sectional view and FIG. 3C is an enlarged view of the first surface 30a.

The objective lens 30, which is made from plastic such as PMMA, is a biconvex lens having first and second aspherical surfaces 30a and 30b. The diffractive lens structure is only formed in a central area 31 of the first surface 30a. As shown in FIG. 3A, the diffractive lens structure is formed, similar to a Fresnel lens, as a large number of concentric rings each of which has a wedge sectional shape. Each of the boundaries between the adjacent rings is formed as a step giving a predetermined optical path difference. A peripheral area 32 of the first surface 30a is formed as a continuous aspherical surface.

Since the first optical disc D1 such as the DVD requires NA of 0.60, while NA of 0.45 is enough for the second optical disc D2 such as the CD or CD-R, the central area 31, which is inside of an effective diameter corresponding to NA 0.45, is a common area for both of the first and second optical discs D1 and D2. Thus, the diffractive lens structure is formed in the central area to reduce aberrations for both of the first and second discs D1 and D2.

On the other hand, since the laser beam outside the NA of 0.45 forms a too small beam spot for the second optical disc D2, the peripheral area 32 that is outside of the effective diameter corresponding to NA 0.45 should be an exclusive area for the first optical disc D1. In this embodiment, the peripheral area 32 is formed as the continuous aspherical surface without steps. An actual diffractive lens structure certainly contains a shape error no matter how the structure is accurately manufactured, which loses the light amount. The continuous surface of the peripheral area 32 prevents the loss of the light amount due to the shape error.

The effective diameter corresponding to NA 0.45 is almost equivalent to an 85% line of the maximum effective diameter of the objective lens 30.

The diffractive lens structure has the wavelength dependence such that the spherical aberration varies In the overcorrected direction as the wavelength increases. Further, the refractive lens varies the spherical aberration in the undercorrected direction as the divergence of the incident beam becomes larger. Therefore, when the laser beam whose wavelength is relatively long has the relatively large divergence, the variation of the spherical aberration caused by the refractive lens can be canceled with the variation of the spherical aberration caused by the diffractive lens structure.

An additional optical path length added by the diffractive lens structure is expressed by the following optical path difference function $\Phi(h)$:

$$\Phi(h)=(P_2h^2+P_4h^4+P_6h^6+ \ldots )\times \lambda$$

where $P_2$, $P_4$ and $P_6$ are diffractive coefficients of second, fourth and sixth orders, h is a height from the optical axis and $\lambda$ is wavelength of incident light. The function $\Phi(h)$ represents an optical path difference between an imaginary ray that is assumed not to be diffracted by the grating and a ray that is diffracted by the grating, at a point on the diffractive lens structure where the height from the optical axis is h. In such an expression, a negative value of the second order coefficient $P_2$ represents a positive paraxial power of the diffractive lens structure. Further, the negative power increases with increasing the distance from the optical axis when the fourth order coefficient $P_4$ is larger than zero.

An actual microscopic shape of the diffractive lens structure is defined like a Fresnel lens having a large number of concentric rings. The actual shape $\Phi'(h)$ is defined by subtracting $\lambda \times m$ (m:integer) from $\Phi(h)$ as follows.

$$\Phi'(h)=(MOD(P_2h^2+P_4h^4+\ldots+C, 1)-C)\times\lambda_B$$

Symbol $\lambda_B$ is a blaze wavelength for which the steps of the grating give an optical path difference by one wavelength. The diffractive efficiency becomes the maximum at the blaze wavelength $\lambda_B$. Symbol C is a constant defining a phase at a boundary between adjacent rings ($0 \leq C < 1$). The function MOD(x, y) represents the remainder when x is divided by y. $MOD(P_2h^2+P_4h^4+\ldots+C, 1)$ is equal to zero at the boundary of the adjacent rings. The diffractive lens structure is formed on the lens surface of the refractive lens. Inclines and steps of the ring areas are designed such that the optical path differences are defined by $\Phi'(h)$.

The objective lens 30 satisfies the following condition (1);

$$7<\Phi(h_{45})/\lambda-P_2\times(h_{45})^2<15 \qquad (1)$$

where $h_{45}$ is the height from the optical axis of a point where a light ray whose NA is 0.45 intersects the diffractive lens structure.

The condition (1) defines the spherical aberration correcting function of the diffractive lens structure that is found by subtracting the power function $P_2\times(h_{45})^2$ from the total optical function $\Phi(h_{45})/\lambda$. Since the peripheral beam whose NA is larger than 0.45 is not used for the second optical disc D2, the condition (1) uses the value at NA 0.45 as the reference. If the intermediate term of the condition (1) becomes lower than 7, the spherical aberration correcting function by the diffractive lens structure becomes too small to cancel the variation of the spherical aberration due to the change of the divergence, which leaves the spherical aberration in the undercorrected direction. On the other hand, when the intermediate term of the condition (1) exceeds 15, the spherical aberration correcting function by the diffractive lens structure becomes too large, which causes the spherical aberration in the overcorrected direction.

When the thickness of the cover layer of the first optical disc D1 is 0.6 mm and the thickness of the cover layer of the second optical disc D2 is 1.2 mm, the wavelength $\lambda_1$ of the first laser beam and the wavelength $\lambda_2$ of the second laser beam satisfy the hollowing condition (2);

$$0.81<\lambda_1/\lambda_2<0.85. \qquad (2)$$

The condition (2) defines the range to obtain the enough spherical aberration correcting function while keeping the high diffraction efficiency for a first order diffraction light. If the ratio of condition (2) is smaller than 0.81, the difference between the wavelengths $\lambda_1$ and $\lambda_2$ becomes too large to keep the average diffraction efficiency high. If the ratio exceeds 0.85, the difference between the wavelengths $\lambda_1$ and $\lambda_2$ becomes too small, which increases the number of the concentric rings to keep the predetermined spherical aberration correcting function, increasing difficulty of manufacturing and reducing the diffractive efficiency.

Further, the blaze wavelength $\lambda_B$ of the diffractive lens structure satisfies $\lambda_1<\lambda_B<\lambda_2$ in the central area 31 in order to keep a high average diffractive efficiency. If the blaze wavelength $\lambda_B$ is set outside the range between $\lambda_1$ and $\lambda_2$, the diffractive efficiency at the farther wavelength from the blaze wavelength $\lambda_B$ is significantly reduced. For example, when $\lambda_1$ is 650 nm and $\lambda_2$ is 780 nm, the diffractive efficiencies at $\lambda_1$ and $\lambda_2$ are 100% and 91%, respectively, when the blaze wavelength $\lambda_B$ is 650 nm, while the diffractive efficiencies at $\lambda_1$ and $\lambda_2$ are 98% and 83%, respectively, when the blaze wavelength $\lambda_B$ is 600 nm.

Further, the objective lens 30 of the embodiment satisfy the following conditions (3) and (4) in the central area 31;

$$0.87<\lambda_B/\lambda_2 \qquad (3)$$

$$\lambda_B/\lambda_1<1.13. \qquad (4)$$

When the conditions (3) and (4) are satisfied, the diffraction efficiencies of the first order diffraction light can be kept high for both of the first and second laser beams. If the condition (3) is not satisfied, the diffraction efficiency of the second laser beam falls short of 95%. If the condition (4) is not satisfied, the diffraction efficiency of the first laser beam falls short of 95%.

As described above, the peripheral area 32 is formed as the continuous aspherical surface in this embodiment. However, the diffractive lens structure may be formed in the peripheral area 32. In such a case, the diffractive lens structure in the peripheral area 32 should be optimized for the first optical disc D1 with the first laser beam. The second order coefficient $P_2$ of the diffractive lens structure in the peripheral area 32 should have negative value. This gives the diffractive lens structure positive refractive power, which compensates axial chromatic aberration.

Further, the blaze wavelength of the diffractive lens structure in the peripheral area 32 should be shorter than that of the central area 31 to be close to the wavelength $\lambda_1$ of the first laser beam. When the blaze wavelength of the peripheral area 32 is shorter than the central area 31, which increases the diffractive efficiency for the first laser beam and decreases that for the second laser beam. Therefore, the peripheral area 32 has a function of an aperture stop for the second laser beam, which prevents the beam spot on the second optical disc D2 from being too small. When the blaze wavelength of the peripheral area 32 is shorter than the wavelength $\lambda_1$ of the first laser beam, the aperture effect becomes larger.

Still further, when the high order coefficient $P_4$ or $P_6$ that defines the diffractive lens structure In the peripheral area 32 has negative value, variation of the aberrations caused by thermal expansion and change of the refractive index of the objective lens 30 due to temperature change can be canceled with the variation of the spherical aberration caused by wavelength shift of the semiconductor laser due to temperature change. In such a case, since the peripheral area 32 has large aberration for the second laser beam, it limits NA of the second laser beam.

Three concrete examples of the optical system of the optical pick-up according to the embodiment will be described hereinafter.

FIRST EXAMPLE

Figure 4:
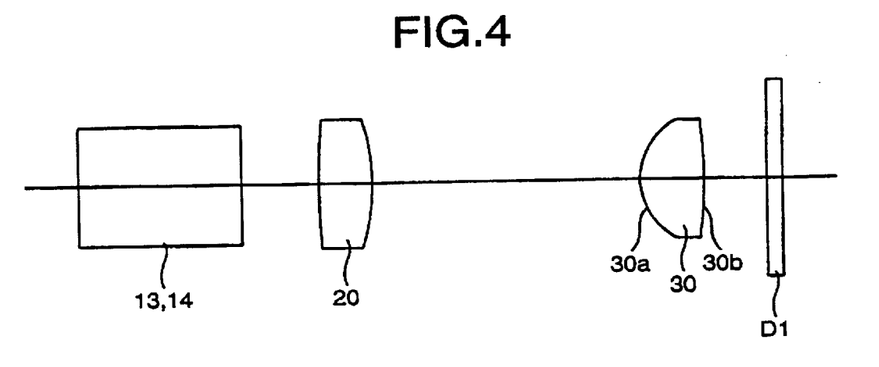
FIG. 4 is a lens diagram of the optical system of a first example.

FIG. 4 is a lens diagram of the optical system of a first example with the first optical disc D1. The optical system includes the beam splitters 13 and 14 that are shown as a single composed unit, the collimator lens 20 and the objective lens 30. The diffractive lens structure is only formed on the central area of the first surface 30a of the objective lens 30 in the first example. It should be noted that the phase grating is not shown in the lens diagram. In the following description, the peripheral area is described as a surface having a diffractive lens structure. However, the peripheral area includes a single ring, it is substantially considered a continuous surface.

The basic construction of the first example is described in TABLE 1. The surfaces #1 and #2 represent the beam splitters 13 and 14, the surfaces #3 and #4 represent the collimator lens 20, the surfaces #5 and #6 represent the objective lens 30 and the surfaces #7 and #8 represent the cover layer of the optical discs D1 and D2.

In TABLE 1, $\lambda_1$ denotes the wavelength of the first laser beam for the first optical disc D1, $\lambda_2$ denotes the wavelength of the second laser beam for the second optical disc D2, $f_{c1}$ and $f_{o1}$ (unit:mm) denote the focal lengths of the collimator lens and the objective lens at the wavelength $\lambda_1$, respectively, $f_{c2}$ and $f_{o2}$ (unit:mm) denote the focal lengths of the collimator lens and the objective lens at the wavelength $\lambda_2$, respectively, $M_1$ denotes magnification at when the wavelength $\lambda_1$, $M_2$ denotes magnification at the wavelength $\lambda_2$, $d_{o1}$ (unit:mm) denotes the distance from the first semiconductor laser to the beam splitter, $d_{o2}$ (unit:mm) denotes the distance from the second semiconductor laser to the beam splitter, ht denotes the maximum effective diameter of the first surface 30a, $h_{45}$ denotes the height from the optical axis of a point where a light ray whose NA is 0.45 intersects the diffractive lens structure.

Further, r (unit:mm) denotes a radius of curvature of a lens surface (the values at the vertex for aspherical surfaces), d (unit:mm) denotes a distance between the surfaces along the optical axis and nλ denotes a refractive index at a wavelength λ nm. For the d7, left values are valid when the first optical disc D1 is used, right values are valid when the second optical disc D2 is used.

TABLE 1

$\lambda_1$ = 650 nm $f_{c1}$ = 12.00 $f_{o1}$ = 4.000 $M_1$ = −0.333 $d_{01}$ = 4.000 $NA_1$ = 0.60
$\lambda_2$ = 785 nm $f_{c2}$ = 12.08 $f_{o2}$ = 4.031 $M_2$ = −0.335 $d_{02}$ = 1.219 $NA_2$ = 0.45
ht = 2.40 mm $h_{45}$ = 1.98 mm

| Surface number | r | d | n650 | n785 |
|---|---|---|---|---|
| #1 | ∞ | 6.000 | 1.51405 | 1.51062 |
| #2 | ∞ | 2.928 | | |
| #3 | 53.056 | 2.000 | 1.58642 | 1.58240 |
| #4 | −8.000 | 10.000 | | |
| #5 | 2.511 | 2.400 | 1.54082 | 1.53665 |
| #6 | −10.401 | 2.279 | | |
| #7 | ∞ | 0.600/1.200 | 1.58030 | 1.57326 |
| #8 | ∞ | | | |

In the first example, the second surface of the collimator lens 20 (surface #4), a base curve of the first surface 30a (surface #5) and the second surface 30b (surface #6) of the objective lens 30 are rotationally symmetrical aspherical surfaces. The base curve is a macroscopic shape of the surface without diffractive lens structure. The rotationally symmetrical aspherical surface is expressed by the following equation:

$$X(h) = \frac{h^2 c}{1 + \sqrt{1 - (1 + \kappa)h^2 c^2}} + A_4 h^4 + A_6 h^6 + A_8 h^8 + A_{10} h^{10} + A_{12} h^{12}$$

X(h) is a SAG, that is, a distance of a curve from a tangential plane at a point on the surface where the height from the optical axis is h. Symbol c is a curvature (1/r) of the vertex of the surface, K is a conic constant, $A_4$, $A_6$, $A_8$, $A_{10}$, $A_{12}$ and Δ are aspherical surface coefficients of fourth, sixth, eighth, tenth and twelfth orders, respectively. The constant K and coefficients $A_4$ through $A_{12}$ are shown in the following TABLE 2. On the first surface 30a of the objective lens 30, the base curve of the central area (0≦h<1.98) is different from that of the peripheral area (1.98≦h), TABLE 2 shows the coefficients of these areas, respectively.

TABLE 2

Second surface of collimator lens (#4)

| κ | −0.7360 |
|---|---|
| A4 | 0.0000 |
| A6 | 5.2000 × 10⁻⁷ |
| A8 | 0.000 |
| A10 | 0.000 |
| A12 | 0.000 |

First surface of objective lens (#5)

| | Central area (0 ≦ h < 1.98) | Peripheral area (1.98 ≦ h) |
|---|---|---|
| r | 2.511 | 2.511 |
| κ | −0.470 | −0.470 |
| A4 | 2.270 × 10⁻⁴ | −1.400 × 10⁻⁴ |
| A6 | 4.900 × 10⁻⁵ | 4.400 × 10⁻⁵ |
| A8 | 4.100 × 10⁻⁶ | −4.600 × 10⁻⁶ |
| A10 | 9.270 × 10⁻⁶ | 1.900 × 10⁻⁶ |
| A12 | −1.244 × 10⁻⁶ | −6.000 × 10⁻⁷ |

Second surface of objective lens (#6)

| κ | 0.000 |
|---|---|
| A4 | 8.607 × 10⁻³ |
| A6 | −7.203 × 10⁻⁴ |
| A8 | −4.525 × 10⁻⁵ |
| A10 | 7.031 × 10⁻⁶ |
| A12 | 0.000 |

The blaze wavelength of the diffractive lens structure in the central area is 710 nm, while that in the peripheral area is 650 nm. TABLE 3 shows the coefficients $P_0$, $P_2$, $P_4$, $P_6$ and $P_8$ for each of the central and peripheral areas. The diffractive lens structure includes ten ring-shaped steps. The area whose ring number 0 is a circular area including the optical axis and the areas whose ring numbers are 1 through 9 are ring areas. The ring numbers 0 through 8 belong to the central area, and the ring number 9 belongs to the peripheral area. Each of the rings is defined by the inner boundary whose height from the optical axis is $h_L$ and the outer boundary whose height from the optical axis is $h_H$ as shown in TABLE 4.

TABLE 3

| | Central area (0 ≦ h < 1.98) | Peripheral area (1.98 ≦ h) |
|---|---|---|
| $P_0$ | 0.0000 | 9.0 |
| $P_2$ | 0.0000 | 0.0 |
| $P_4$ | 0.31034 | 0.0 |
| $P_6$ | −0.023604 | 0.0 |
| $P_8$ | 0.024258 | 0.0 |

TABLE 4

| Ring number | $h_L$ | $h_H$ | Ring number | $h_L$ | $h_H$ |
|---|---|---|---|---|---|
| 0 | 0.000 | 1.307 | 5 | 1.784 | 1.838 |
| 1 | 1.307 | 1.508 | 6 | 1.838 | 1.886 |
| 2 | 1.508 | 1.628 | 7 | 1.886 | 1.927 |
| 3 | 1.628 | 1.715 | 8 | 1.927 | 1.977 |
| 4 | 1.715 | 1.784 | 9 | 1.977 | 2.400 |

The values of the items included in the condition (1) are found from TABLE 3 as follows.

$\Phi(h_{45})/\lambda = 9.0774$ $P_2(h_{45})^2 = 0.0$

The coefficients of the optical path difference function $\Phi(h)$ for the peripheral area show that the actual shape of the peripheral area adds the optical distance by nine times of the wavelength to the base curve. More specifically, the peripheral area is an aspherical surface defined by TABLE 5 that is shifted from the base curve of the central area along the optical axis by 10.8169 $\mu$m. The shift amount is found by the following equation.

$-9.0 \times 650 \text{ nm}/(1-1.54082) = 10.8169 \ \mu\text{m}$

TABLE 5

| | |
|---|---|
| r | 2.5072 |
| $\kappa$ | $-0.470$ |
| A4 | $-1.400 \times 10^{-4}$ |
| A6 | $4.400 \times 10^{-5}$ |
| A8 | $-4.600 \times 10^{-6}$ |
| A10 | $1.900 \times 10^{-6}$ |
| A12 | $-6.070 \times 10^{-7}$ |

Figure 5A:
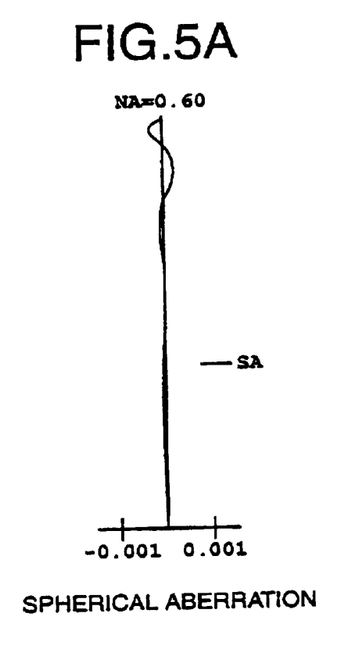
FIGS. 5A and 5B are graphs showing spherical aberration and astigmatism, respectively, of the optical system according to the first example with the first optical disc.
Figure 5B:
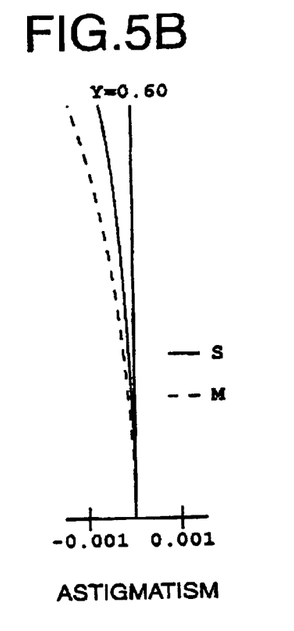
Figure 6A:
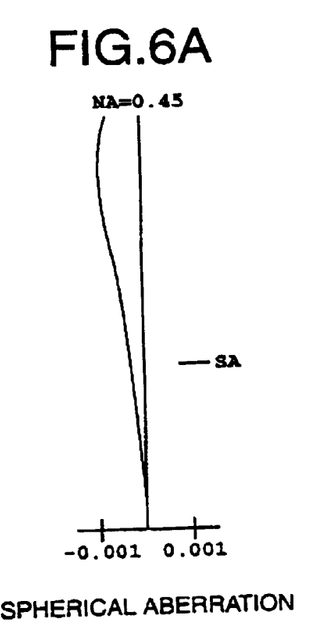
FIGS. 6A and 6B are graphs showing spherical aberration and astigmatism, respectively, of the optical system according to the first example with the second optical disc.
Figure 6B:
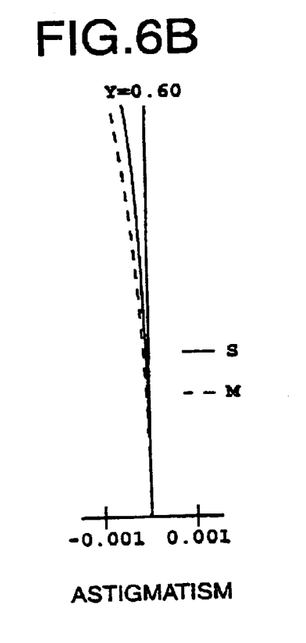

FIGS. 5A and 5B show third order aberrations of the objective lens 30 according to the first example when the first optical disc D1 is used at wavelength of 650 nm. FIG. 5A shows spherical aberration SA and sine condition SC, FIG. 5B shows astigmatism (S: Sagittal, M: Meridional). The vertical axis of FIG. 5A represents numerical aperture NA and the vertical axis of FIG. 5B represents an image height Y. Further, horizontal axes represent amount of aberrations. Units of the vertical axis of FIG. 5A and the horizontal axes are "mm". FIGS. 6A and 6B show the spherical aberration and the astigmatism of the objective lens 30 when the second optical disc D2 is used at wavelength of 785 nm.

SECOND EXAMPLE

Figure 7:
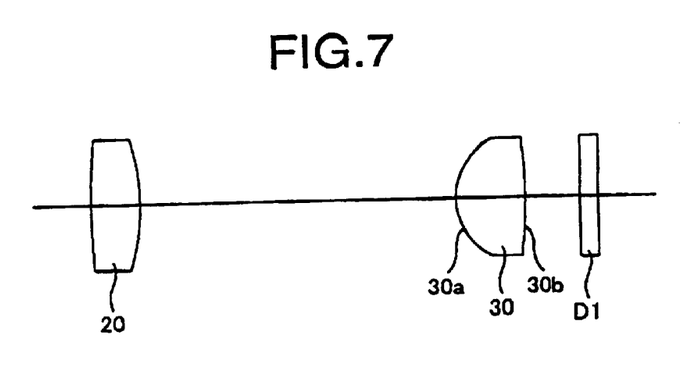
FIG. 7 is a lens diagram of the optical system according to a second example.

FIG. 7 is a lens diagram of the optical system of a second example with the first optical disc D1. In FIG. 7, the collimator lens 20, the objective lens 30 and the first optical disc D1 are only shown. The diffractive lens structure is formed on both of the central and peripheral areas of the first surface 30a of the objective lens 30 in the second example.

The basic construction of the second example is described in TABLE 6. In TABLE 6, the surfaces #1 and #2 represent the collimator lens 20, the surfaces #3 and #4 represent the objective lens 30 and the surfaces #5 and #6 represent the cover layer of the optical discs D1 and D2.

TABLE 6

$\lambda_1 = 650$ nm $f_{c1} = 10.00$ $f_{o1} = 3.300$ $M_1 = -0.330$ $d_{01} = 9.101$
$NA_1 = 0.60$ $\lambda_2 = 780$ nm $f_{c2} = 10.07$ $f_{o2} = 3.311$ $M_2 = -0.362$
$d_{02} = 6.009$ $NA_2 = 0.45$ ht = 2.00 mm $h_{4S} = 1.67$ mm

| Surface number | r | d | n650 | n780 |
|---|---|---|---|---|
| #1 | 107.677 | 1.500 | 1.58642 | 1.58252 |
| #2 | $-6.170$ | 10.000 | | |
| #3 | 2.152 | 2.300 | 1.54082 | 1.53677 |
| #4 | $-7.294$ | 1.653 | | |
| #5 | $\infty$ | 0.600/1.200 | 1.58030 | 1.57346 |
| #6 | $\infty$ | | | |

In the second example, the second surface of the collimator lens 20 (surface #2), the base curve of the first surface 30a (surface #3) and the second surface 30b (surface #4) of the objective lens 30 are rotationally symmetrical aspherical surfaces. The constant K and coefficients $A_4$ through $A_{12}$ for each of aspherical surfaces are shown in TABLE 7.

TABLE 7

| Second surface of collimator lens (#2) | |
|---|---|
| $\kappa$ | $-0.4000$ |
| A4 | $1.4060 \times 10^{-4}$ |
| A6 | $2.6000 \times 10^{-6}$ |
| A8 | $3.7000 \times 10^{-8}$ |

| First surface of objective lens (#3) | | |
|---|---|---|
| | Central area ($0 \leq h < 1.67$) | Peripheral area ($1.67 \leq h$) |
| r | 2.152 | 2.144 |
| $\kappa$ | $-0.560$ | $-0.560$ |
| A4 | $2.149 \times 10^{-3}$ | $1.600 \times 10^{-3}$ |
| A6 | $-2.345 \times 10^{-4}$ | $-5.400 \times 10^{-4}$ |
| A8 | $3.550 \times 10^{-4}$ | $2.200 \times 10^{-4}$ |
| A10 | $-3.310 \times 10^{-5}$ | $-2.390 \times 10^{-5}$ |
| A12 | $8.300 \times 10^{-7}$ | $1.520 \times 10^{-6}$ |

| Second surface of objective lens (#4) | |
|---|---|
| $\kappa$ | 0.000 |
| A4 | $1.760 \times 10^{-2}$ |
| A6 | $-1.900 \times 10^{-5}$ |
| A8 | $-1.940 \times 10^{-3}$ |
| A10 | $6.780 \times 10^{-4}$ |
| A12 | $-7.970 \times 10^{-5}$ |

The blaze wavelength of the diffractive lens structure in the central area is 710 nm, whole that in the peripheral area is 650 nm. TABLE 8 shows the coefficients $P_0$, $P_2$, $P_4$, $P_6$ and $P_8$ for each of the central and peripheral areas. The diffractive lens structure includes fifteen ring-shaped steps. The area whose ring number 0 is a circular area including the optical axis and the areas whose ring numbers 1 through 14 are ring areas. The ring numbers 0 through 7 belong to the central area, and the ring numbers 8 through 14 belongs to the peripheral area. Each of the rings is defined in TABLE 9.

TABLE 8

|  | Central area (0 ≤ h < 1.67) | Peripheral area (1.67 ≤ h) |
|---|---|---|
| $P_0$ | 0.0 | 0.0 |
| $P_2$ | -4.66295 | -3.94187 |
| $P_4$ | 0.90257 | 0.45269 |
| $P_6$ | -0.20873 | -0.50432 |
| $P_8$ | 0.12198 | 0.08305 |

TABLE 9

| Ring number | $h_L$ | $h_H$ | Ring number | $h_L$ | $h_H$ |
|---|---|---|---|---|---|
| 0 | 0.000 | 0.473 | 8 | 1.670 | 1.700 |
| 1 | 0.473 | 0.684 | 9 | 1.700 | 1.750 |
| 2 | 0.684 | 0.860 | 10 | 1.750 | 1.799 |
| 3 | 0.860 | 1.026 | 11 | 1.799 | 1.849 |
| 4 | 1.026 | 1.213 | 12 | 1.850 | 1.903 |
| 5 | 1.213 | 1.528 | 13 | 1.903 | 1.962 |
| 6 | 1.528 | 1.621 | 14 | 1.962 | 2.000 |
| 7 | 1.621 | 1.670 |  |  |  |

The values of the items included in the condition (1) are found from TABLE 8 as follows.

$$\Phi(h_{45})/\lambda = -3.1365$$

$$P_2(h_{45})^2 = -13.0045$$

The boundary between the outermost ring of the central area (ring number 7) and the innermost ring of the peripheral area (ring number 8) has a step such that the outermost ring adds a thickness by 15 μm in the optical axis direction.

Figure 8A:
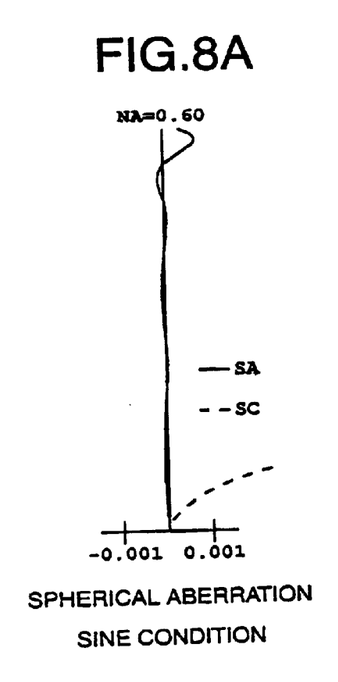
FIGS. 8A and 8B are graphs showing spherical aberration and astigmatism, respectively, of the optical system according to the second example with the first optical disc.
Figure 8B:
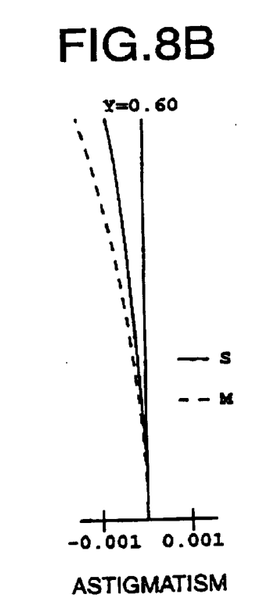
Figure 9A:
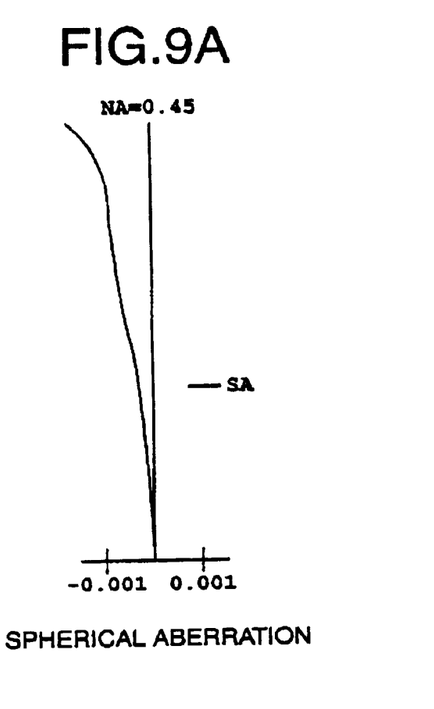
FIGS. 9A and 9B are graphs showing spherical aberration and astigmatism, respectively, of the optical system according to the second example with the second optical disc.
Figure 9B:
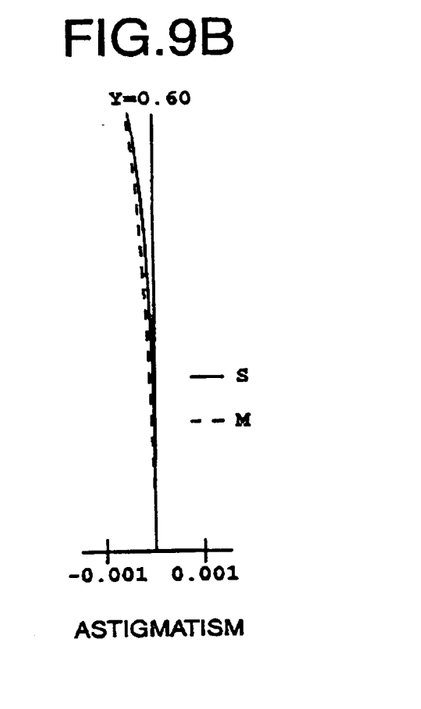

FIGS. 8A and 8B show the spherical aberration and the astigmatism of the objective lens 30 according to the second example when the first optical disc D1 is used at wavelength of 650 nm. FIGS. 9A and 9B show the spherical aberration and the astigmatism of the objective lens 30 when the second optical disc D2 is used at wavelength of 780 nm.

THIRD EXAMPLE

Figure 10:
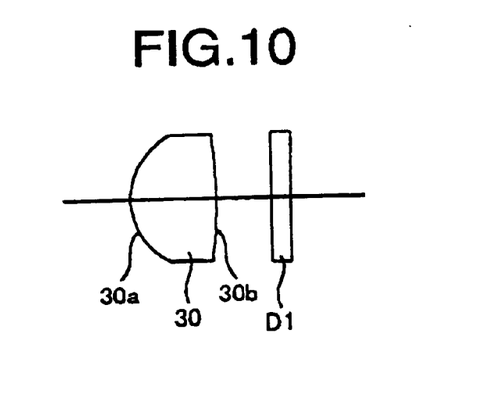
FIG. 10 is a lens diagram of the optical system according to a third example.

FIG. 10 is a lens diagram of the optical system of a third example with the first optical disc D1. In FIG. 10, the objective lens 30 and the first optical disc D1 are only shown. The diffractive lens structure is only formed on the central area on the first surface 30a of the objective lens 30 in the third example.

The basic construction of the second example is described in TABLE 10. In TABLE 10, the surfaces #1 and #2 represent the objective lens 30 and the surfaces #3 and #4 represent the cover layer of the optical discs D1 and D2. Further, $d_{o1}$ and $d_{o2}$ denote object distances of the objective lens 30 at the wavelength $\lambda_1$ and $\lambda_2$, respectively, only in the third example.

TABLE 10

$\lambda_1$ = 650 nm $f_{o1}$ = 3.201 $M_1$ = -0.000 $d_{o1}$ = ∞ $NA_1$ = 0.60
$\lambda_2$ = 780 nm $f_{o2}$ = 3.223 $M_2$ = -0.1117 $d_{o2}$ = 31.385 $NA_2$ = 0.45
ht = 1.92 mm $h_{45}$ = 1.63 mm

| Surface number | r | d | n650 | n780 |
|---|---|---|---|---|
| 1 | 2.111 | 2.400 | 1.54082 | 1.53677 |
| 2 | -6.170 | 1.544 |  |  |
| 3 | ∞ | 0.600/1.200 | 1.58030 | 1.57346 |
| 4 | ∞ |  |  |  |

In the third example, the base curve of the first surface 30a (surface #1) and the second surface 30b (surface #2) of the objective lens 30 are rotationally symmetrical aspherical surfaces. The constant K and coefficients $A_4$ through $A_{12}$ for each of aspherical surfaces are shown in TABLE 11.

TABLE 11

| First surface of objective lens (#1) | | |
|---|---|---|
|  | Central area (0 ≤ h < 1.63) | Peripheral area (1.63 ≤ h) |
| κ | -0.560 | -0.560 |
| A4 | 2.5600 × 10⁻³ | -1.025 × 10⁻³ |
| A6 | -2.5070 × 10⁻³ | 4.166 × 10⁻⁴ |
| A8 | 1.1363 × 10⁻³ | 8.809 × 10⁻⁵ |
| A10 | -1.0568 × 10⁻⁴ | -3.198 × 10⁻⁵ |
| A12 | -6.2000 × 10⁻⁶ | -5.100 × 10⁻⁶ |
| Second surface of objective lens (#2) | | |
| κ | 0.000 | |
| A4 | 1.198 × 10⁻² | |
| A6 | 1.174 × 10⁻² | |
| A8 | -1.088 × 10⁻² | |
| A10 | 3.381 × 10⁻³ | |
| A12 | -3.943 × 10⁻⁴ | |

The blaze wavelength of the diffractive lens structure in the central area is 710 nm, whole that in the peripheral area is 650 nm. TABLE 12 shows the coefficients $P_0$, $P_2$, $P_4$, $P_6$ and $P_8$ for each of the central and peripheral areas. The diffractive lens structure includes nine ring-shaped steps. The area whose ring number 0 is a circular area including the optical axis and the areas whose ring numbers are 1 through 8 are ring areas. The ring numbers 0 through 7 belong to the central area, and the ring number 8 belongs to the peripheral area. Each of the rings is defined in TABLE 13.

TABLE 12

|  | Central area (0 ≤ h < 1.63) | Peripheral area (1.63 ≤ h) |
|---|---|---|
| $P_0$ | 0.0 | -20.000 |
| $P_2$ | 0.0 | 0.0 |
| $P_4$ | 2.95580 | 0.0 |
| $P_6$ | -2.49050 | 0.0 |
| $P_8$ | 0.92108 | 0.0 |
| $P_{10}$ | -0.08143 | 0.0 |

TABLE 13

| Ring number | $h_L$ | $h_H$ | Ring number | $h_L$ | $h_H$ |
|---|---|---|---|---|---|
| 0 | 0.000 | 0.905 | 5 | 1.474 | 1.522 |
| 1 | 0.905 | 1.171 | 6 | 1.522 | 1.516 |
| 2 | 1.171 | 1.322 | 7 | 1.516 | 1.594 |
| 3 | 1.322 | 1.412 | 8 | 1.594 | 1.623 |
| 4 | 1.412 | 1.474 | | | |

The values of the items included in the condition (1) are found from TABLE 12 as follows.

$$\Phi(h_{45})/\lambda = 9.301$$

$$P_2(h_{45})^2 = 0.000$$

Figure 11A:
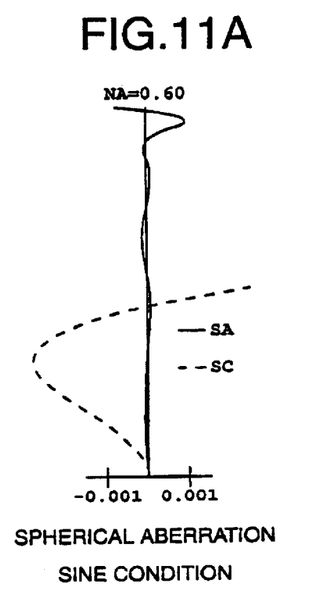
FIGS. 11A and 11B are graphs showing spherical aberration and astigmatism, respectively, of the optical system according to the third example with the first optical disc.
Figure 11B:
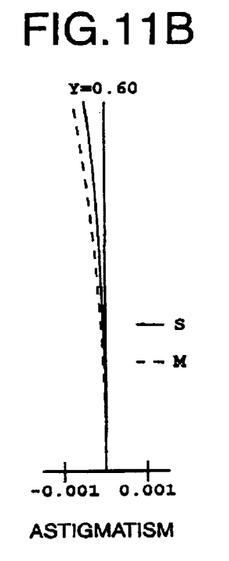
Figure 12A:
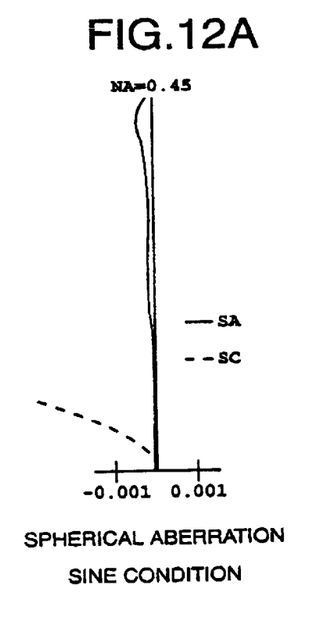
FIGS. 12A and 12B are graphs showing spherical aberration and astigmatism, respectively, of the optical system according to the third example with the second optical disc.
Figure 12B:
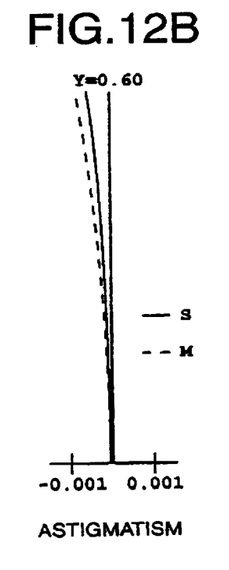

FIGS. 11A and 11B show the spherical aberration and the astigmatism of the objective lens 30 according to the third example when the first optical disc D1 is used at wavelength of 650 nm. FIGS. 12A and 12B show the spherical aberration and the astigmatism of the objective lens 30 when the second optical disc D2 is used at wavelength of 780 nm.

The objective lens of the third example requires an aberration-free parallel laser beam for the first optical disc and an aberration-free divergent laser beam for the second optical disc. Thus, a collimator lens is preferably mounted for each of two semiconductor lasers. Further, the aspherical surfaces of the collimator lens should be designed in consideration of effects of parallel plates such as a cover glass of a semiconductor laser, a prism for combining or separating a light beam.

TABLE 14 shows relationships between the conditions (1) through (4) and the first, second and third examples. All of the examples satisfy all of the conditions.

TABLE 14

| | 1st Ex. | 2nd Ex. | 3rd Ex. |
|---|---|---|---|
| (1) $\phi(h_{45})/\lambda - P_2(h_{45})^2$ | 9.077 | 9.868 | 9.301 |
| (2) $\lambda_1/\lambda_2$ | 0.828 | 0.833 | 0.833 |
| (3) $\phi_B/\lambda_2$ | 0.904 | 0.910 | 0.910 |
| (4) $\phi_B/\lambda_1$ | 1.092 | 1.092 | 1.092 |

The present disclosure relates to the subject matter contained in Japanese Patent Application No. HEI 11-117213, filed on Apr. 23, 1999, which is expressly incorporated herein by reference in its entirety.

What is claimed is:

1. An optical system of an optical pick-up that is capable of using a first optical disc having a first cover layer and a second optical disc having a second cover layer thicker than said first cover layer, said optical system comprising:

a light source portion that emits a first laser beam having a first wavelength for said first optical disc and a second laser beam having a second wavelength longer than said first wavelength for said second optical disc; and an objective lens that converges said first laser beam from said light source portion onto an information layer of said first optical disc through said first cover layer and that converges said second laser beam from said light source portion onto an information layer of said second optical disc through said second cover layer, said objective lens being provided with a diffractive lens structure that has a plurality of concentric ring-shaped steps that have wavelength dependence such that spherical aberration varies in the overcorrected direction as wavelength of incident light increases, wherein divergence of said second laser beam incident on said objective lens is larger than divergence of said first laser beam, and wherein said objective lens converges said first and second laser beams of an identical diffractive order while keeping a constant distance between said objective lens and the surfaces of said first and second cover layers.

2. The optical system according to claim 1, wherein the following condition (1) is satisfied;

$$7 < \Phi(h_{45})/\lambda - P_2 \times (h_{45})^2 < 15 \quad (1)$$

where $h_{45}$ is the height from the optical axis of a point where a light ray of which NA is 0.45 intersects said diffractive lens structure, $\lambda$ is the wavelength of said light, and $P_2$ is a second order coefficient when an additional optical path length added by said diffractive lens structure is expressed by the following optical path difference function $\Phi(h)$:

$$\Phi(h) = (P_2 h^2 + P_4 h^4 + P_6 h^6 + \ldots) \times \lambda$$

where $P_4$ and $P_6$ are coefficients of forth and sixth orders, and h is a height from the optical axis.

3. The optical system according to claim 1, wherein the thickness of said first cover layer is 0.6 mm and the thickness of said second cover layer is 1.2 mm, and wherein said first wavelength $\lambda_1$ and said second wavelength $\lambda_2$ satisfy the following condition (2);

$$0.81 < \lambda_1/\lambda_2 < 0.85. \quad (2)$$

4. The optical system according to claim 3, wherein the blaze wavelength $\lambda_B$ of said diffractive lens structure satisfies $\lambda_1 < \lambda_B < \lambda_2$ at least in a central area close to the optical axis.

5. The optical system according to claim 4, wherein said blaze wavelength $\lambda_B$ of said diffractive lens structure in said central area satisfies the following conditions (3) and (4);

$$0.87 < \lambda_B/\lambda_2 \quad (3)$$

$$\lambda_B/\lambda_1 < 1.13. \quad (4)$$

6. The optical system according to claim 4, wherein the additional optical path length added by said ring-shaped step of said diffractive lens structure in a peripheral area is shorter than that in said central area.

7. The optical system according to claim 1, wherein said diffractive lens structure is formed within a central area of a lens surface of said objective lens, and a peripheral area of said lens surface is formed as a continuous surface, and wherein at least an area outside an 85% line of an effective diameter of said objective lens is defined as said peripheral area.

8. The optical system according to claim 1, wherein said light source portion emits said laser beams such that said first laser beam is incident on said objective lens as a parallel beam and said second laser beam is incident on said objective lens as a divergent beam.

* * * * *